(12) United States Patent
Kim

(10) Patent No.: US 9,814,288 B2
(45) Date of Patent: Nov. 14, 2017

(54) UNIT-EXPANDABLE MOBILE COMMUNICATION DEVICE CASE

(71) Applicant: ROBOTIS CO. LTD., Seoul (KR)

(72) Inventor: Byoung Soo Kim, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 9 days.

(21) Appl. No.: 14/766,130

(22) PCT Filed: Apr. 18, 2013

(86) PCT No.: PCT/KR2013/003263
§ 371 (c)(1),
(2) Date: Aug. 5, 2015

(87) PCT Pub. No.: WO2014/133220
PCT Pub. Date: Sep. 4, 2014

(65) Prior Publication Data
US 2015/0374088 A1    Dec. 31, 2015

(30) Foreign Application Priority Data

Feb. 26, 2013    (KR) .................. 10-2013-0020550

(51) Int. Cl.
| A45C 11/00 | (2006.01) |
| A45C 11/18 | (2006.01) |
| A45C 13/00 | (2006.01) |
| A45C 13/10 | (2006.01) |
| A63H 33/04 | (2006.01) |

(Continued)

(52) U.S. Cl.
CPC ............ *A45C 11/00* (2013.01); *A45C 11/182* (2013.01); *A45C 13/004* (2013.01); *A45C 13/10* (2013.01); *A63H 33/04* (2013.01); *H04B 1/3888* (2013.01); *A45C 15/00* (2013.01); *A45C 2011/002* (2013.01); *A45C 2011/003* (2013.01)

(58) Field of Classification Search
CPC ..... A45C 11/00; A45C 11/182; A45C 13/004; A45C 13/10; A45C 15/00; A45C 2011/002; A45C 2011/003; A63H 33/04; H04B 1/3888
USPC ........................................................ 224/576
See application file for complete search history.

(56) References Cited

U.S. PATENT DOCUMENTS 6,540,461 B1 *  4/2003  Hawang ................. F16B 21/02
                                                         411/41
6,736,691 B1 *  5/2004  Bach .................... A63H 33/101
                                                         446/116

(Continued)

FOREIGN PATENT DOCUMENTS

KR         20120003539        *    5/2012

*Primary Examiner* — Peter Helvey
(74) *Attorney, Agent, or Firm* — Revolution IP, PLLC

(57) ABSTRACT

The present invention provides a unit-expandable communication device case that can achieve various functions. According to an embodiment of the present invention, the unit-expandable mobile communication device case includes a case, couplers, and a unit. The case has a flat plate which has a plurality of coupling holes formed with regular intervals in any one of a column direction and a row direction, and is detachably attached to a mobile communication device. The couplers are coupled to the coupling holes. The unit has one or more coupling holes and detachably attached to the case by being coupled to the couplers.

10 Claims, 10 Drawing Sheets

(51) Int. Cl.
*H04B 1/3888* (2015.01)
*A45C 15/00* (2006.01)

(56) References Cited

U.S. PATENT DOCUMENTS

2008/0075528 A1* 3/2008 Marzetta .............. A63H 33/042
    403/238
2009/0017716 A1* 1/2009 Marzetta .............. A63H 33/108
    446/128

* cited by examiner

[Fig. 1]
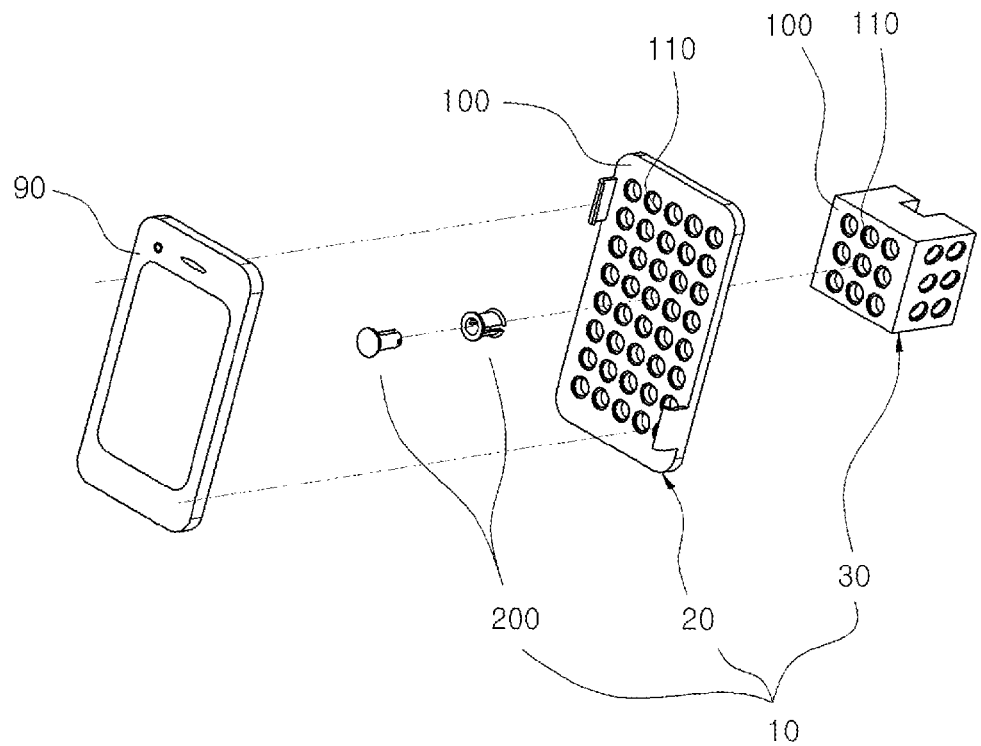
[Fig. 2]
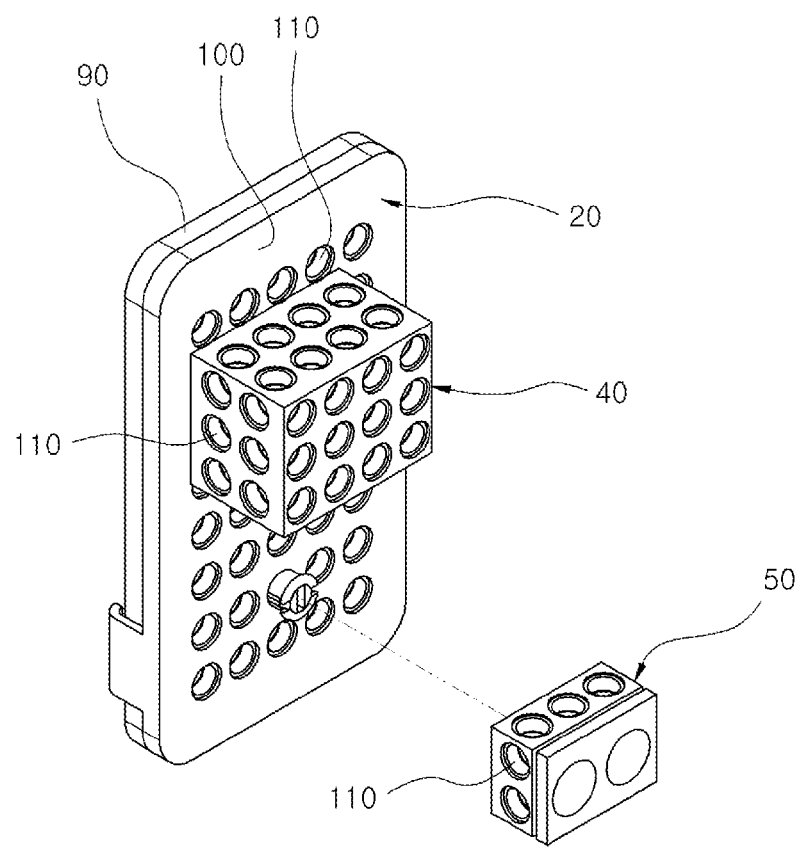

[Fig. 3]
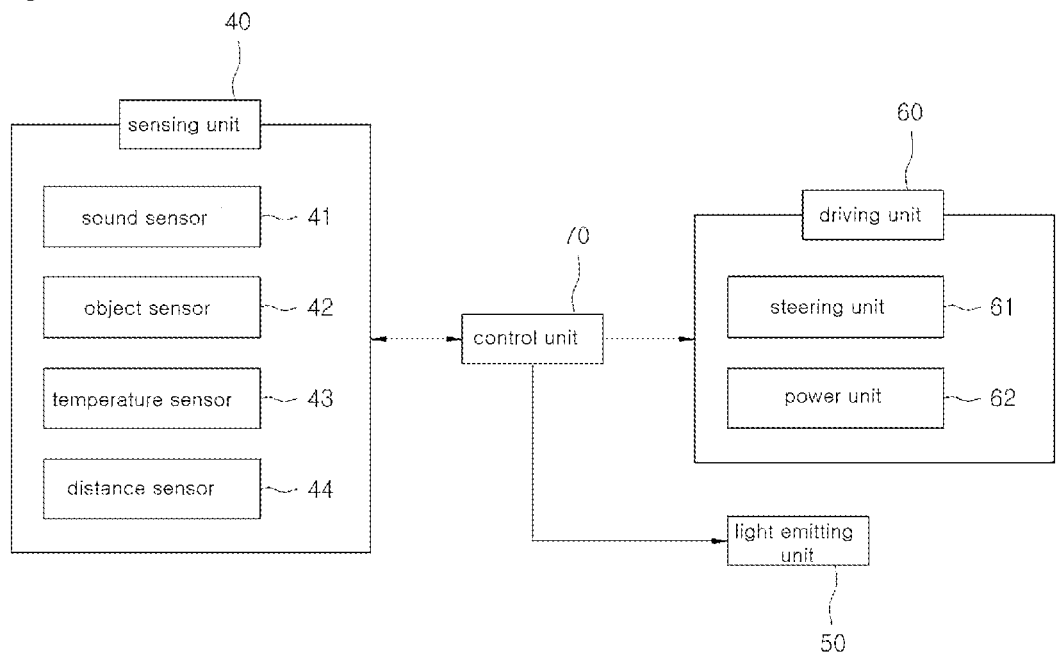
[Fig. 4]
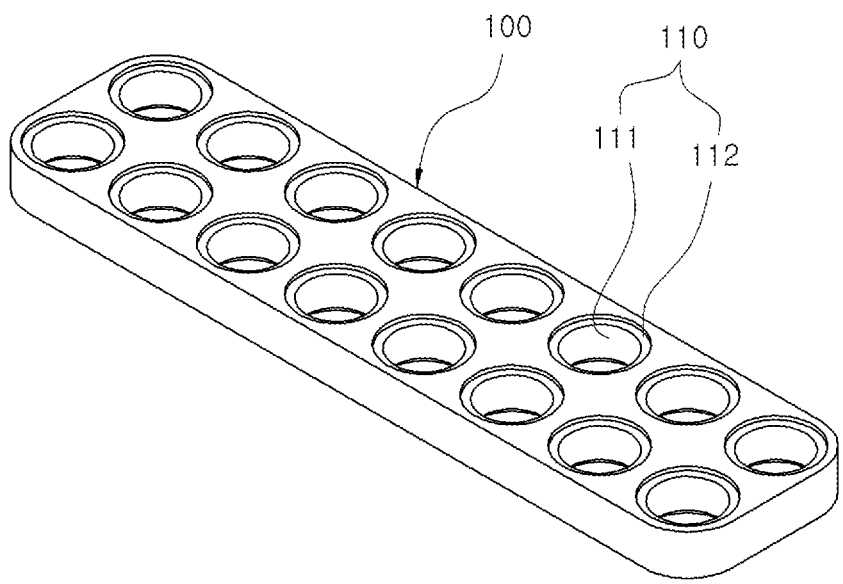

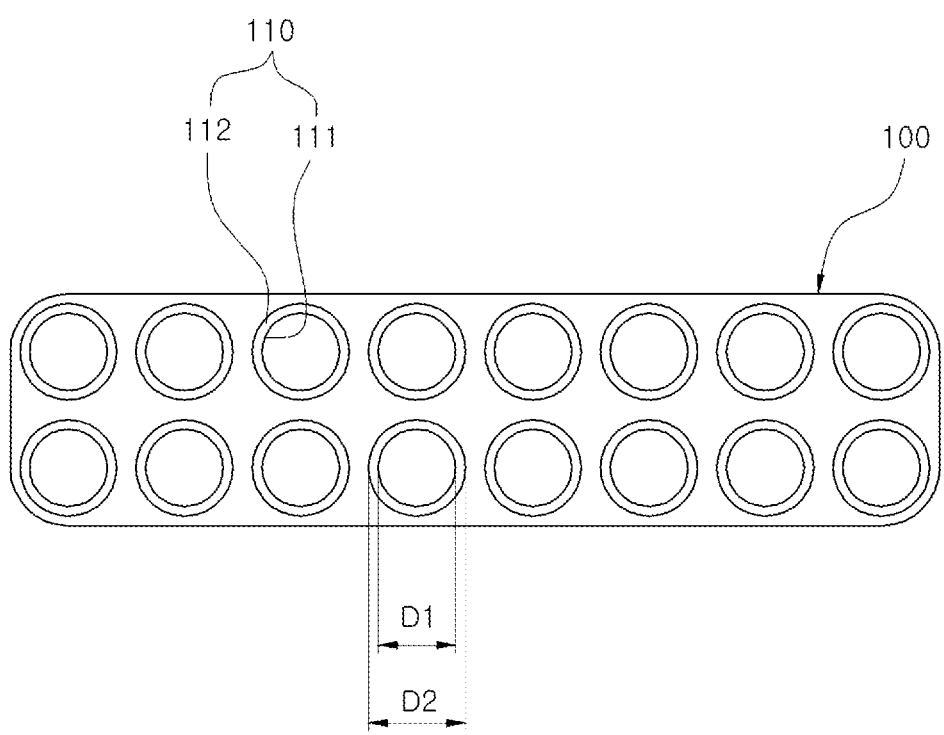

[Fig. 6]
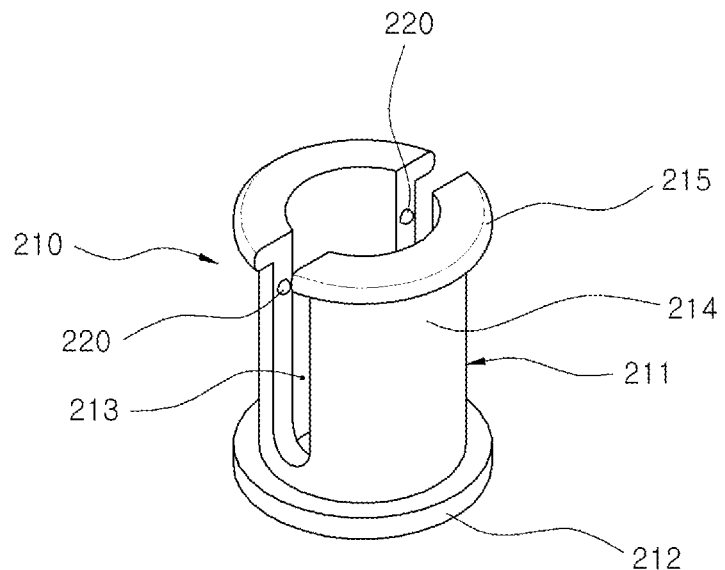
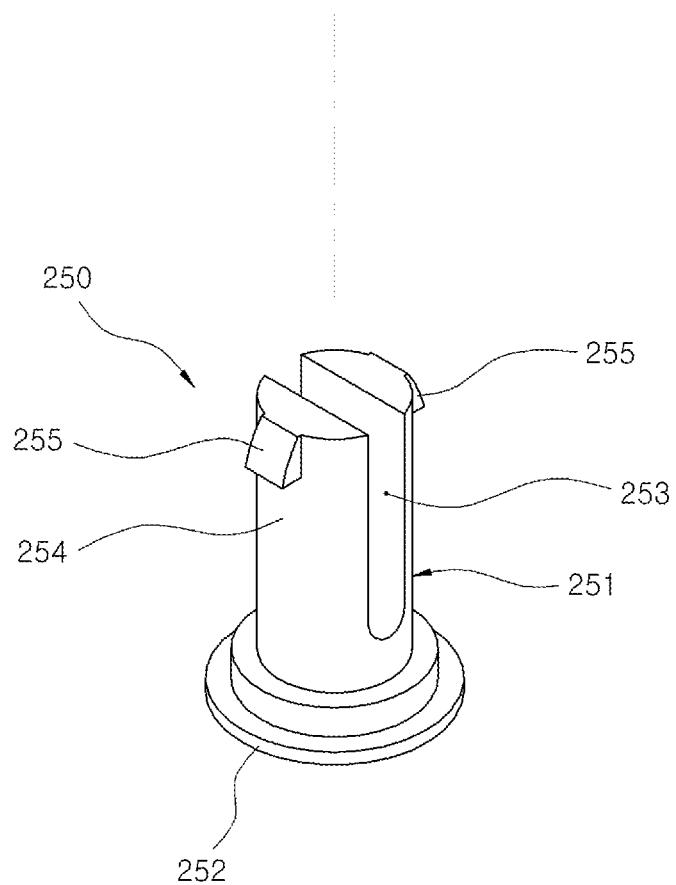

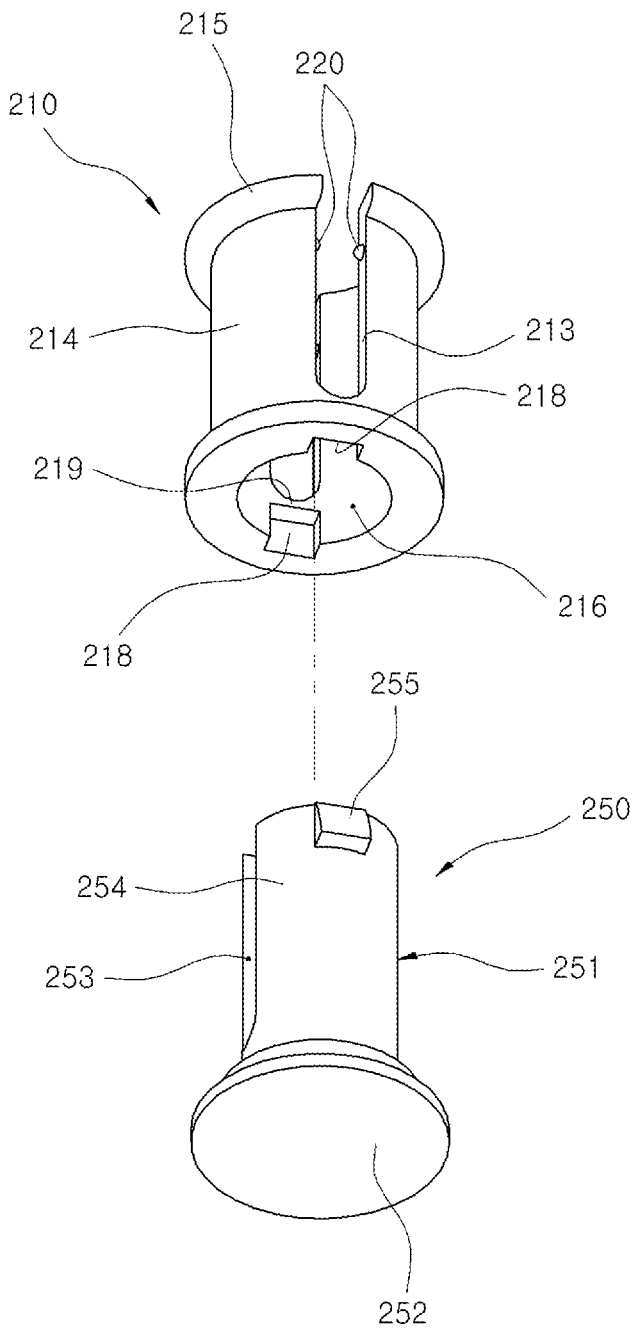
[Fig. 7]

[Fig. 8]
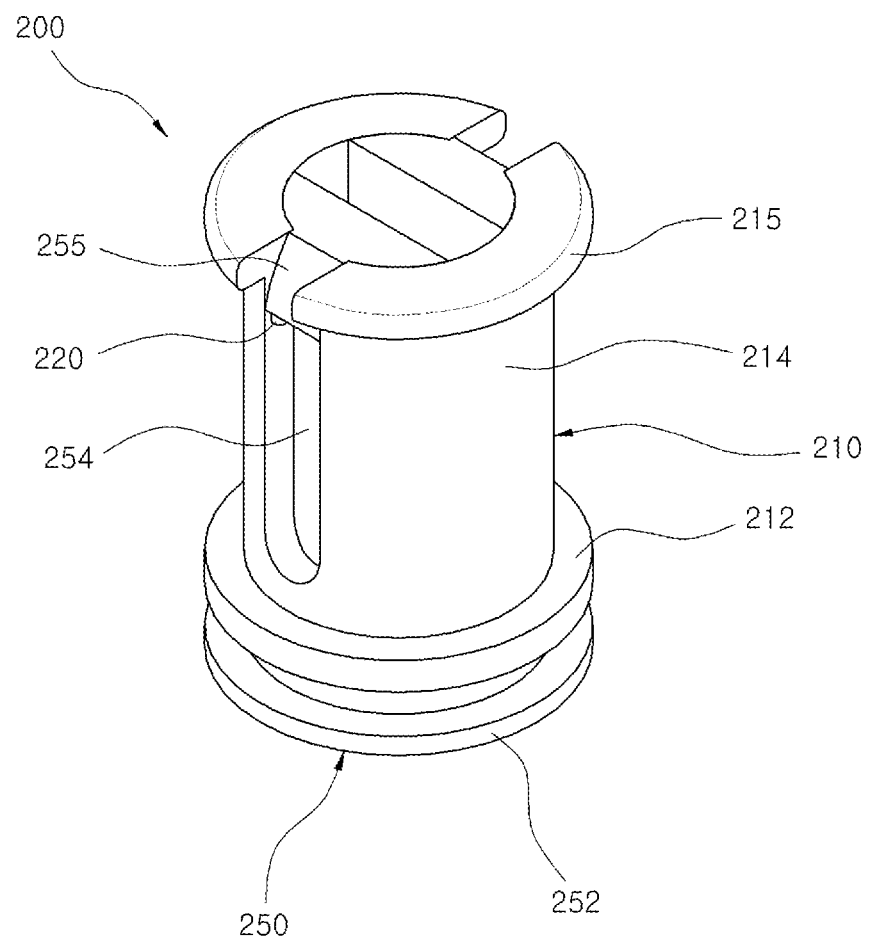

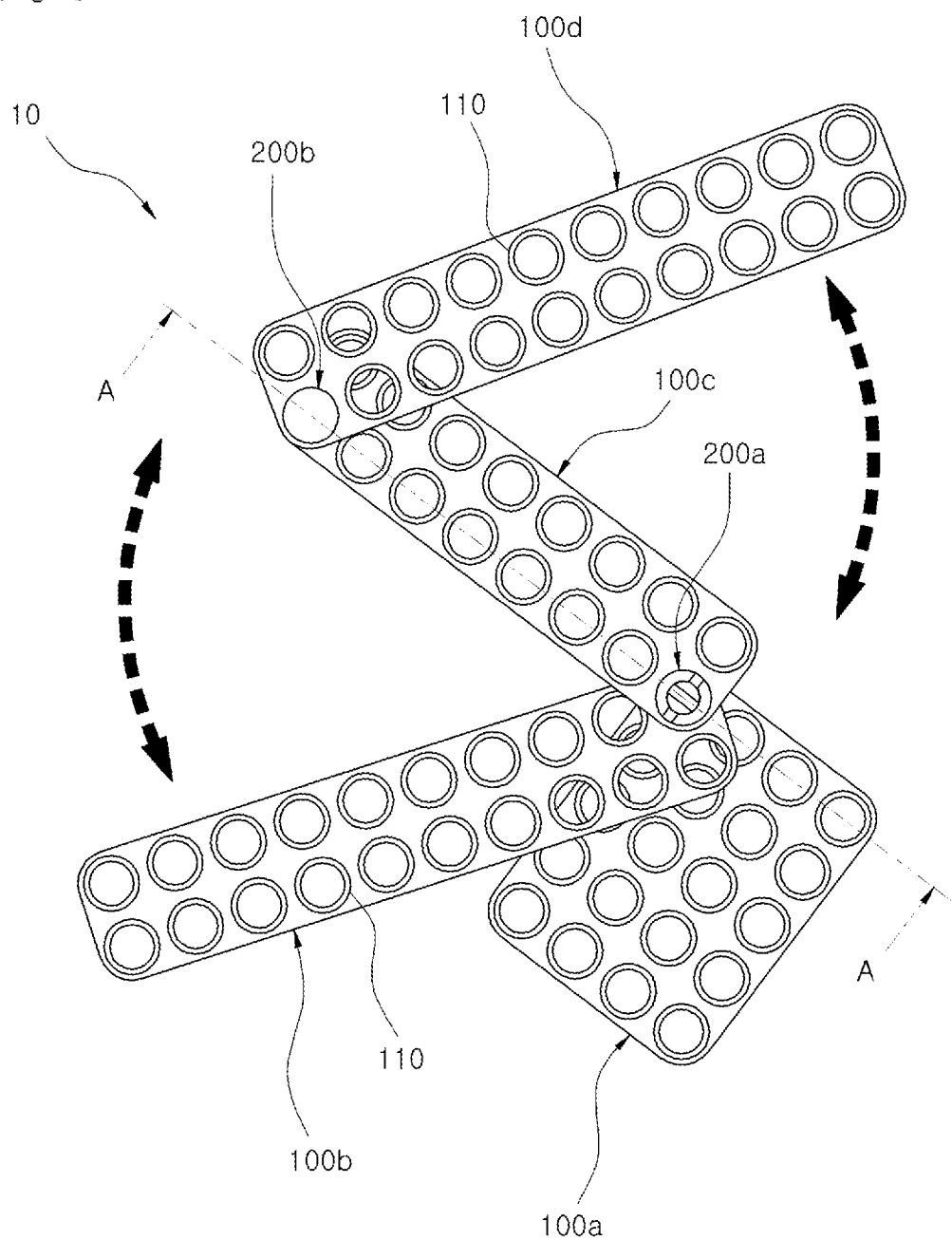
[Fig. 9]

[Fig. 10]
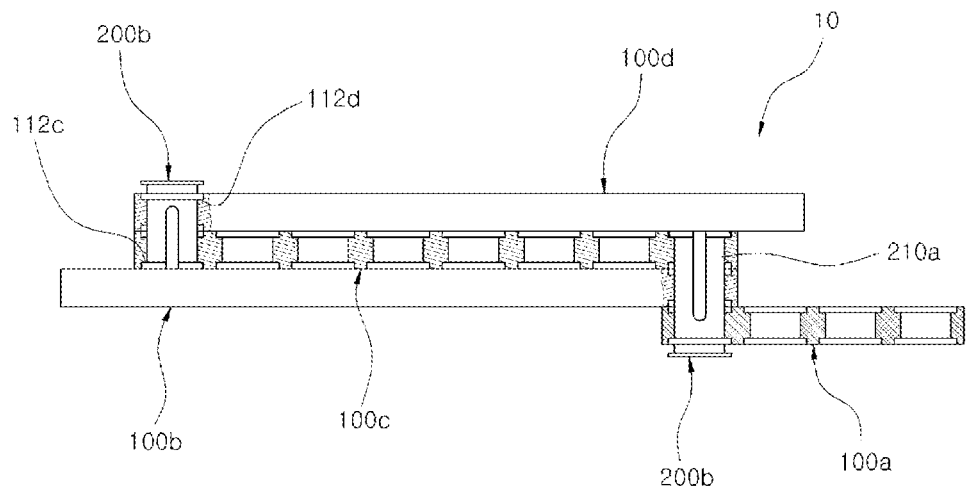
[Fig. 11]
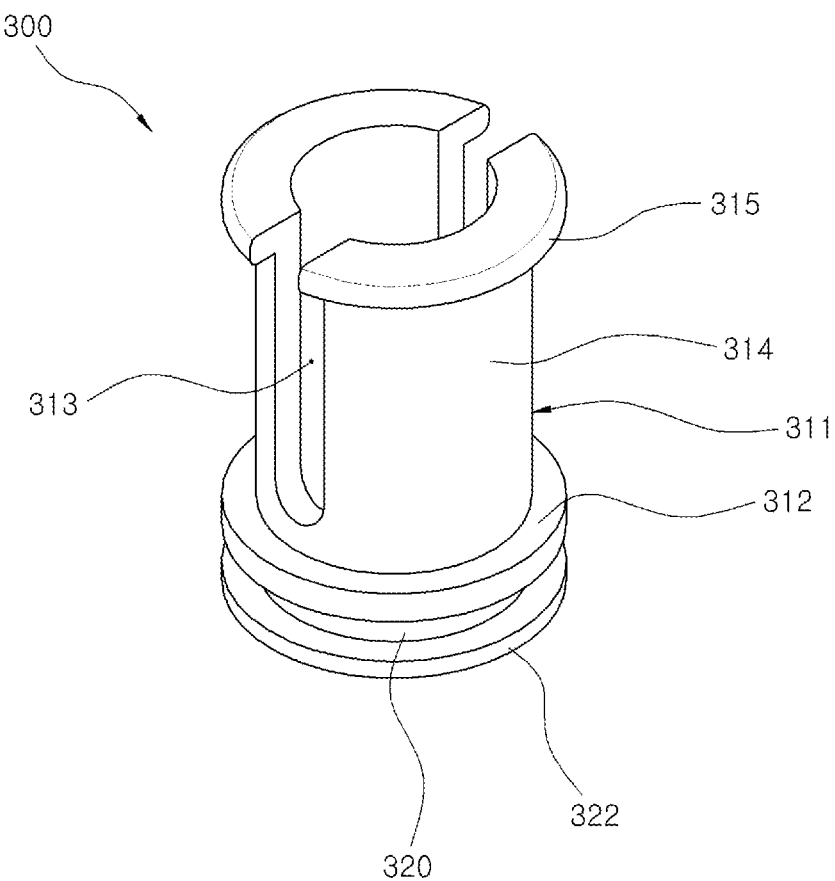

[Fig. 12]
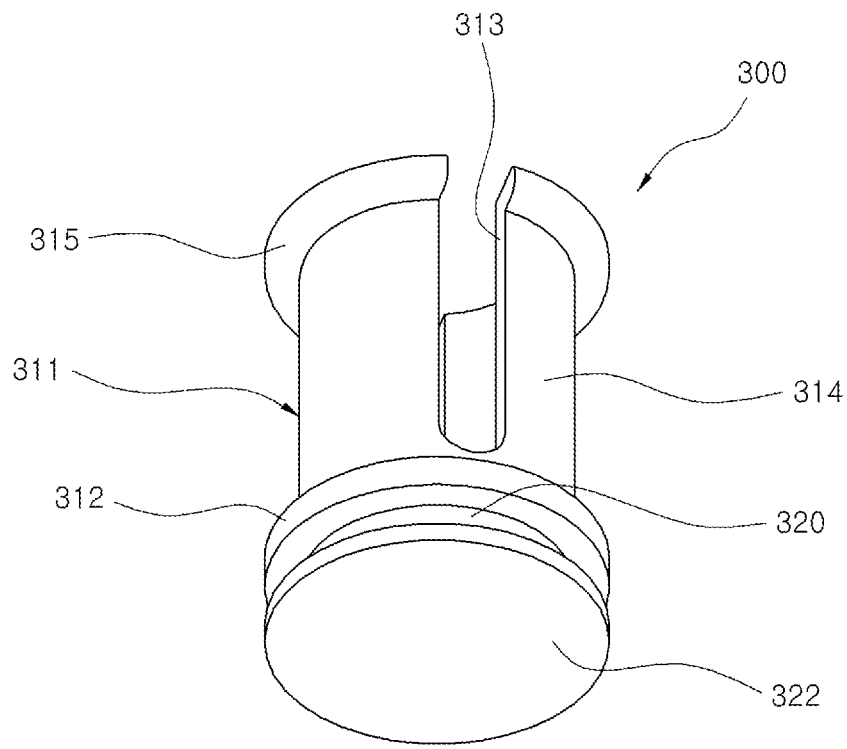
[Fig. 13]
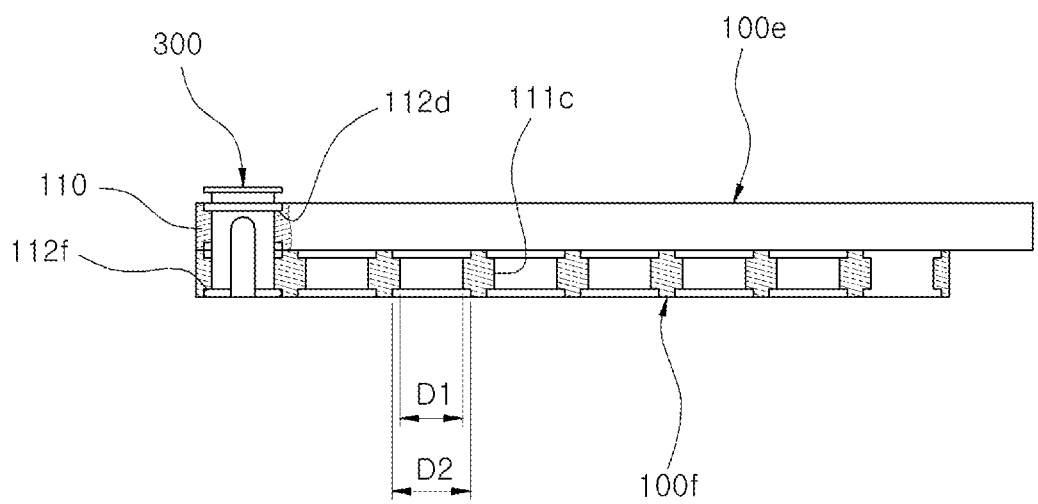

[Fig. 14]
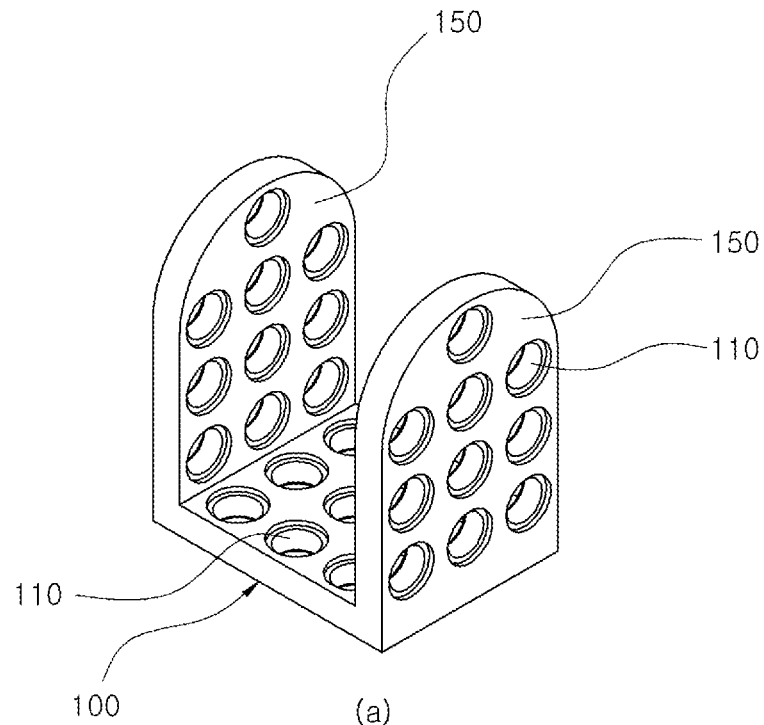
(a)
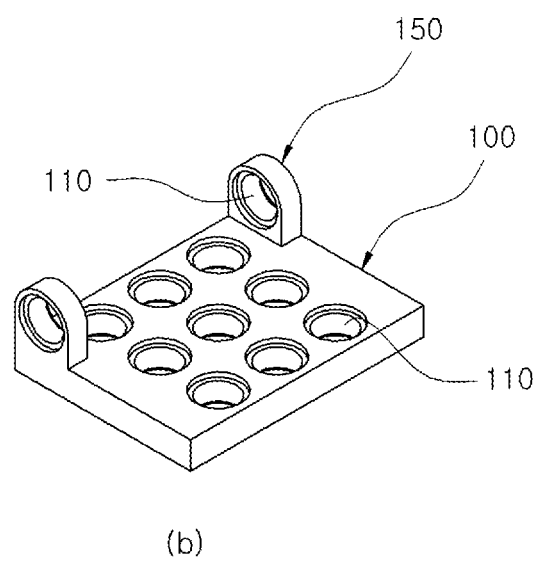
(b)

UNIT-EXPANDABLE MOBILE COMMUNICATION DEVICE CASE

TECHNICAL FIELD

The present invention relates to a unit-expandable mobile communication device case, and more particularly, to a unit-expandable mobile communication device case that can achieve various functions.

BACKGROUND ART

In general, cases are used for mobile communication devices such as a smartphone, a mobile phone, a tablet PC, and a PDA to prevent scratches and to protect them from external shock.

These cases are made of plastic or synthetic rubber and used in cover types, wallet types, etc.

Cover type cases are usually formed to cover the sides and the rear of mobile communication devices, but unlike the existing types formed to simply correspond to the shapes of mobile communication devices, recently, cases having the shapes of various characters have been released.

Wallet type cases are practical in that they have both of the function as a case for a mobile communication device and the function of a wallet, having pockets for carrying credit cards etc.

However, the cover type cases are focused on simply protecting the mobile communication devices from external shocks and the wallet type cases are focused on practical use, so the younger generation who are sensitive to new trends easily lose their interest and quickly change the cases.

Accordingly, continuous effort has been made to satisfy the increasing and various demands of users of mobile communication devices and to integrate smart functions.

SUMMARY OF INVENTION

Technical Problem

In order to solve the problems, an object of the present invention is to provide a unit-expandable mobile communication device case that embodies various functions.

Solution to Problem

In order to achieve the object, an embodiment of the present invention provides a unit-expandable mobile communication device case that includes: a case having a first flat plate, which has a plurality of coupling holes formed with regular intervals in any one of a column direction and a row direction, and detachably attached to a mobile communication device; couplers inserted in the coupling holes; and a unit having one or more of the coupling holes and detachably attached to the case by being coupled to the couplers.

In an embodiment of the present invention, the unit may include one or more second plates coupled by other couplers.

In an embodiment of the present invention, the unit may further include a sensor unit composed of one or more of a sound sensor, an object sensor, a temperature sensor, and a distance sensor.

In an embodiment of the present invention, the unit may further include: a driving unit including a steering unit for turning and steering wheels moving the case and a power unit transmitting torque to the wheels; and a control unit connected to the sensor unit and the driving unit and controlling the driving unit so that the case moves when predetermined stimulation is inputted to the sensor unit, and the sensor unit, the driving unit, and the control unit may be connected through a wire or wirelessly.

In an embodiment of the present invention, the unit may further include a light emitting unit emitting light when predetermined stimulation is inputted to the sensor unit, and the sensor unit and the light emitting unit may be connected through a wire or wirelessly.

In an embodiment of the present invention, the unit may be a figure.

In an embodiment of the present invention, the coupling holes may have a through hole having a first diameter and a locking groove having a second diameter larger than the first diameter, formed on both sides of the first plate or the second plate, and making a step with the through hole.

In an embodiment of the present invention, the coupler may include: a socket having a first body that has first elastic portions inserted in the coupling hole and divided by first slits and elastically radially deforming, a first step that is formed at one end of the first body and inserted in a locking step on the outer side of the outermost plate of coupled plates, and a second locking step that is formed at the first elastic portions and inserted in a locking groove on the outer side of another outermost plate of the coupled plates; and a rivet having second elastic portions that have an outer diameter corresponding to the inner diameter of an insertion hole formed axially through the socket, are divided by second slits, and elastically radially deform, a second body that is inserted in the insertion hole and radially supports the first elastic portions, and a head that is formed at an end of the second body.

In an embodiment of the present invention, guide grooves may be formed in the longitudinal direction of the first slit on an extension line of the first slits on the inner side of the insertion hole of the socket and may be spaced from the first slits, and guide projections inserted in the guide groove and sliding along the first slits may be formed on the outer sides of the second elastic portions.

In an embodiment of the present invention, stoppers protruding inward from the first slits and restricting movement of the guide projections that have been coupled, may be further formed in the first slits.

In an embodiment of the present invention, the coupler may have: a third body having third elastic portions inserted in the coupling hole, divided by third slits, and elastically radially deforming, a third step formed at an end of the third body and inserted in a locking groove on the outer side of any uppermost plate of coupled plates, a fourth step formed at the third elastic portions and inserted in locking grooves on the outer side of another outermost plate of the coupler plates, and an extension extending in the longitudinal direction of the third body from the fourth step and having a head at an end.

Advantageous Effects of Invention

According to the present invention, units having various shapes and functions can be detachably attached to the mobile communication device case and the units can be expanded, so various functions can be achieved by coupling units.

According to the present invention, the unit may include a plate, a sensor unit, a driving unit, a light emitting unit, and a control unit, so the light emitting unit can emit light or the driving unit can move the case, in response to stimulation inputted through the sensor unit, and accordingly, various operations can be achieved.

The effects of the present invention are not limited to those described above and should be construed as including all of effect that can be inferred from the configuration of the present invention described in the detailed description or claims.

BRIEF DESCRIPTION OF DRAWINGS

FIG. 1 is an exemplary view showing a unit-expandable mobile communication device case according to an embodiment of the present invention.

FIG. 2 is an exemplary view showing an assembly of a unit and a unit-expandable mobile communication device case according to an embodiment of the present invention.

FIG. 3 is an exemplary view showing the configuration between units of a unit-expandable mobile communication device case according to an embodiment of the present invention.

FIG. 4 is a perspective view showing a plate of a unit-expandable mobile communication device case according to an embodiment of the present invention.

FIG. 5 is a plan view showing the plate of a unit-expandable mobile communication device case according to an embodiment of the present invention.

FIGS. 6 and 7 are exploded perspective views showing a coupler of a unit-expandable mobile communication device case according to an embodiment of the present invention.

FIG. 8 is an assembly view showing the coupler of a unit-expandable mobile communication device case according to an embodiment of the present invention.

FIG. 9 is an assembly view showing the plate and the coupler of a unit-expandable mobile communication device case according to an embodiment of the present invention.

FIG. 10 is a cross-sectional view taken along line A-A of FIG. 9.

FIGS. 11 and 12 are perspective views showing a coupler of a unit-expandable mobile communication device case according to another embodiment of the present invention.

FIG. 13 is an assembly view showing the plate and the coupler of a unit-expandable mobile communication device case according to another embodiment of the present invention.

FIG. 14 is an exemplary view showing a modification of the plate of a unit-expandable mobile communication device case according to an embodiment of the present invention.

DESCRIPTION OF EMBODIMENTS

Hereinafter, the present invention will be described with reference to the accompanying drawings. However, the present invention may be modified in various ways and is not limited to the embodiments described herein. Furthermore, the parts that are irrelevant to the description are not shown in the figures in order to make the present clear, and like reference numerals are given to like components throughout the specification.

Throughout the specification, it should be understood that when one component is referred to as being "connected to" another component, it may be "connected directly to" another element or "indirectly connected to" another component with the other component therebetween. Furthermore, unless explicitly described otherwise, "comprising" any components will be understood to imply the inclusion of other components rather than the exclusion of any other components.

Embodiments of the present invention are described hereafter in detail with reference to the accompanying drawings.

FIG. 1 is an exemplary view showing a unit-expandable mobile communication device case according to an embodiment of the present invention, FIG. 2 is an exemplary view showing an assembly of a unit and a unit-expandable mobile communication device case according to an embodiment of the present invention, FIG. 3 is an exemplary view showing the configuration between the units of a unit-expandable mobile communication device case according to an embodiment of the present invention.

As shown in FIGS. 1 to 3, a unit-expandable mobile communication device case 10 may include a case 20, couplers 200, and a unit 30.

A mobile communication device 90 should be understood as a comprehensive term including digital devices such as the tablet PC, the PDA, and the web pad, in addition to the smartphone, the mobile phone, and the telephone.

The case 20 is detachably attached to the mobile communication device 90, on the rear side of the mobile communication device 90. The case 20 may have a first flat plate having a plurality of coupling holes 110 formed with regular intervals in one of the column and row directions.

The case 20 may be implemented by one first plate 100. In this case, the first plate may partially cover the sides of the mobile communication device 90, so the case 20 can be detachably attached to the mobile communication device 90. Furthermore, the case 20 may be composed of two or more first plates 100, in which the first plates 100 may be coupled by the couplers 200. When the case 20 is composed of two or more first plates 100, the first plates 100 may be individually attached to/detached from the mobile communication device 90. One or more coupling holes may be formed in the unit 30 too, and the couplers 200 can be inserted in the coupling holes 110. The unit 30 can be detachably attached to the case 20 by the couplers 200.

The unit 30 may have various hardware shapes. For example, the unit 30 may include a part such as various sensors, motors, controllers, and power transmitters, or a frame such as a flat second plate 100 having a plurality of through holes formed with regular intervals at least in any one of the column and row directions.

Although the plate of the case 20 and the plate of the unit 30 were referred to with different names, "first plate" and "second plate", respectively, in the description above, plates having through holes formed in the same shape and size and having the same thickness may be the same plates. In the present invention, plates having through holes, which have the same shape, size, and gaps, and the same thickness may be defined as the same plates and they are not classified into different ones based on the area and shape. That is, the plate of the case 20 is the same in thickness as the plate of the unit 30 and has through holes having the same shape and size and formed with the same intervals, so they may be the same. Accordingly, the plates are given the same reference numeral and generally referred to as "plates 100" in the following description.

The couplers 200 can couple two or more plates by being inserted in the coupling holes 110 of two or more plates 100.

The unit 30 can be attached to/detached from the case 20, which is possible by fitting/separating the coupling holes 110 formed in the plate 100 of the case onto/from the couplers 200 inserted in the coupling holes 110 of the plate 100 that may be a type of the unit 30.

The unit 30 may include two or more plates 100 and the plates 100 are coupled by the couplers 200, so they may be assembled in various shapes and types. For example, the unit 30 may have the shape of a figure. The figure may be construed as including models with non-movable joints, in addition to models having movable joints and capable of making various actions. Accordingly, the figure may be formed in various shapes such as an animal, a plant, a vehicle, an airplane, and a building.

That is, the unit 30 may be implemented with joints being movable by being assembled by two or more plates 100 and the couplers 200.

The unit 30 may further include a sensing unit 40, a light emitting unit 50, a driving unit 60, and a control unit 70.

The sensor unit 40 may be composed of one or more of a sound sensor 41, an object sensor 42, a temperature sensor 43, and a distance sensor 44. The sensor unit 40 may further include various sensors other than the sensors. For example, it may further include an infrared sensor and a contact sensor.

The light emitting unit 50 may have various light sources, for example, a light emitting device such as an LED. The light emitting unit 50 can emit light in response to predetermined stimulation inputted to the sensor unit 40. The light emitting unit 50 and the sensor unit 40 may be connected through a wire or wirelessly.

Predetermined stimulation that is inputted to the sensor unit 40 may be a predetermined sound, for example, a sound at a predetermined decibel or more or having a predetermined pattern, when the sound sensor 41 senses it. The predetermined stimulation may be set in various ways by a user. For example, when clapping sounds at a predetermined decibel or more are inputted to the sensor unit 40 with predetermined intervals, the light emitting unit 50 may emit light. The light emitting unit 50 may have various light sources emitting various colors, so light with various colors can be emitted in accordance with predetermined stimulation inputted to the sensor unit 40.

As for the temperature sensor 43, temperature at a predetermined level or more or less of that predetermined level of temperature may be the predetermined stimulation. In this case, light with various colors may be emitted in accordance with the level of the temperature at the place where the unit 30 is located.

The predetermined stimulation that is inputted to the sensor unit 40 may be set in various ways for each sensor in the sensor unit 40, so lights of various colors can be emitted.

The driving unit 60 may include a steering unit 61 and a power unit 62.

The steering unit 61 may be a device changing the direction of wheels (not shown) mounted on the case 20 and moving the case 20, by turning them. The power unit 62 may transmit torque to the wheels. The power unit 62 may include various motors, such as a servo motor, and may also include a battery for supplying electricity.

The control unit 70 may be connected with the sensor unit 40 and the driving unit 60, and can control the driving unit 60 to move the case 20 when predetermined stimulation is inputted to the sensor unit 40. The control unit 70 can adjust a moving speed of the case 20 by controlling rotation of the wheels by controlling the power unit 62, and can adjust the moving direction of the case 20 by controlling the steering unit 61.

The sensor unit 40, driving unit 60, and control unit 70 may be connected by a wire or wirelessly.

The control unit 70 can control the driving unit 60 in different ways in accordance with predetermined stimulation inputted to the sensor unit 40. The operation pattern of the driving unit 60 according to predetermined stimulation inputted to the sensor unit 40 may be set in advance, and the operation pattern of the driving unit 60 may be set by an operation program.

For example, when predetermined sound stimulation is inputted to the sensor unit 40 and the case 20 is set to move to the point where the sound stimulation is generated, the case 20 can move to a user, when the user generates predetermined sound stimulation. In this case, the control unit 70 can control the movement of the case 20 by freely changing the path to the point where the sound stimulation was generated, that is, the point where the user is, using other stimulation inputted to the sensor unit 40, for example, whether the object sensor 42 senses an object or not, or distance information sensed by the distance sensor 44. According to this configuration, when a user is located far from a mobile communication device, the user can save the trouble of going to get the mobile communication system by generating predetermined sound stimulation so that the case 20 comes to the user.

Coupling holes 110 the same as the coupling holes 110 formed in the plate 100 of the case 20 may be formed in the sensor unit 40, light emitting unit 50, driving unit 60, and control unit 70, so coupling may be possible by these coupling holes and the couplers 200. Coupling holes may be formed in the steering unit 61 and the power unit 62, in addition to the sound sensor 41, object sensor 42, temperature sensor 43, and distance sensor 44.

The unit 20 may include not only plate 100, but various items of hardware such as the sensor unit 40, light emitting unit 50, driving unit 60, and control unit 70, and may further include other various items of hardware. The items of hardware or the hardware and the case 20 may be coupled. Accordingly, such unit can be expanded on the case 20 without limit, so various shapes can be freely achieved.

FIG. 4 is a perspective view showing a plate of a unit-expandable mobile communication device case according to an embodiment of the present invention, FIG. 5 is a plan view showing the plate of a unit-expandable mobile communication device case according to an embodiment of the present invention, FIGS. 6 and 7 are exploded perspective views showing a coupler of a unit-expandable mobile communication device case according to an embodiment of the present invention, FIG. 8 is an assembly view showing the coupler of a unit-expandable mobile communication device case according to an embodiment of the present invention, FIG. 9 is an assembly view showing the plate and the coupler of a unit-expandable mobile communication device case according to an embodiment of the present invention, and FIG. 10 is a cross-sectional view taken along line A-A of FIG. 9.

As shown in FIGS. 4 to 10, the plate 100 may be a flat plate. The plate 100 may be not only a rectangular plate including a square shape, but a circular plate. The coupling holes 110 may be formed with regular intervals in any one of the column direction and the row direction in the plate 100.

The number of coupling holes 110 may be various in the column direction and the row direction; for example, (the number of row holes in the column direction)*6 (the number of coupling holes in the column direction), 1*7, 1*11, 2*5, 2*6, 2*7, 2*8, 2*15, 3*5, 3*7, 4*5, 5*5, 5*7, and 5*12. The plate 100 may be made of plastic.

The coupling holes 110 may have a through hole 111 and a locking groove 112. The through hole 111 may have a first diameter D1 and the first diameter D1 may be 3.9~4.1 mm.

The locking groove 112 may be formed on both sides of the plate 100, having a second diameter D2 larger than the first diameter D1. The second diameter D2 may be 4.9~5.1 mm and the locking groove 112 may be 0.8~1.0 mm sized. Accordingly, the locking groove 112 can make a step with the through hole 111.

The couplers 200 can be inserted in the coupling holes 110 of two or more plates 100, and thus two or more plates 100 can be coupled.

The couplers 200 each may include a socket 210 and a rivet 250 selectively coupled to/separated from the socket 210.

The socket 210 may have a first body 211, a first step 212, and a second step 215.

The first body 211 is a part that is inserted in the coupling hole 110 and makes the body of the socket 210.

The first step 212 may be formed at an end of the first body 211 and fitted in a locking groove 112d (see FIG. 9) on the outermost plate 100d (see FIG. 9) of the coupled plates. The outer diameter of the first step 212 may correspond to the second diameter D2 of the locking groove 112, so when the first step 212 is positioned in the locking groove 112, the socket 210 cannot shake or rattle.

First elastic portions 241 divided by first slits 213 and elastically deforming may be formed in the first body 211. The outer diameters of the first elastic portions 214 may be the same as the outer diameter of the first body 211, and the outer diameters of the first body 211 and the first elastic portions 214 may correspond to the first diameter D1 of the first through holes 111 of the coupling holes 110.

Since the first elastic portions 214 are divided by the first slits 213, when an external force is applied, the ends of the first elastic portions 214 can move close to each other. Furthermore, when the external force applied to the first elastic portions 214 is removed, elasticity causes the first elastic portions 214 can return to the original shape.

The second step 215 may be formed at the ends of the first elastic portions 214 and coupled to the locking grooves 112c (see FIG. 10) on another outermost plate 100c (see FIG. 10) of the coupled plates. An insertion hole 216 may be formed axially through the socket 210.

The rivet 250 may be composed of a second body 251 and a head 252.

The second body 251 may be inserted in the insertion hole 216 of the socket 210 and may have an outer diameter corresponding to the inner diameter of the insertion hole 216. Furthermore, second elastic portions 254 divided by second slits 253 and radially elastically deforming may be formed in the second body 251.

When the second elastic portions 254 are inserted in the insertion hole 216, they radially support the first elastic portions 214. Since the first elastic portions 214 are supported by the second elastic portions 254, the first elastic portions 214 cannot deform inward, so the coupler 200 cannot be separated from the coupling hole 110.

The socket 210 and the second body 251 may have a length that is integer times the thickness of the plate 100. Accordingly, when the socket 210 and the rivet 250 are inserted in the coupling hole 110, the socket 210 is not exposed outside the plate 100. Therefore, as shown in FIGS. 8 and 9, when a plurality of plates are coupled and rotated, the plates may not be locked by each other, so they can rotate smoothly. It is possible to assembly various shapes of figures by coupling the plate 100 and the couplers 200 using this coupling method.

The head 252 may be formed at an end of the second body 251. The head 252 may have a diameter corresponding to the outer diameter of the first step 212. The head 252 may be formed to have a predetermined depth, so the head 252 can protrude outside the plate 100 after the rivet 250 is inserted in the socket 210. As described above, since a user can hold the protruding head 252 with their hand, the user can separate the rivet 250 from the socket 210 by pulling the head 252. The head 252 may be inclined or stepped in the longitudinal direction of the second body 251 so that a user can more easily hold the head with a hand.

Guide grooves 218 may be formed on the inner side of the insertion hole 216 of the socket 210. The guide grooves 218 may extend in the longitudinal direction of the first slits 213 on an extension line of the first slits 213 and may have a width corresponding to the width of the first slits 213. The guide grooves 218 may be spaced from the first slits 213, so steps 219 are formed between the guide groove 218 and the first slits 213 by the inner side of the insertion hole 216.

Also, guide projections 255 may protrude on the outer sides of the second elastic portions 254 of the rivet 250. The guide projections 255 may have a width corresponding to the guide grooves 218 and a height corresponding to the depth of the guide grooves 218. The guide projections 255 may be inserted in the guide grooves 218, and they may be deformed such that the second elastic portions 254 come close to each other, and slide over the steps 219, when they are locked and pressed to the steps 219 between the guide grooves 218 and the first slits 213 after sliding along the guide grooves 218. Thereafter, the guide projections 255 may be positioned in the first slits 213 and slide along the first slits 213, so that the rivet 250 can be correctly coupled to the socket 210.

A stopper 220 for restricting the guide projection 255 that has been coupled may be formed in the first slits 213. The stopper 220 may protrude inward from the first slit 213 and may be provided in a pair. Accordingly, it is possible to effectively prevent the guide projections 255, which have been coupled, from sliding back in the opposite direction to the insertion direction along the first slits 213.

As shown in FIGS. 9 and 10, three plates 100a, 100b, and 100c from the bottom may be coupled by one coupler 200a. In this case, the length of the socket 210a of the coupler 200a may be three times the thickness of the plates. The tree plates 100a, 100b, and 100c coupled by the coupler 200a may individually rotate around the coupler 200a.

In addition, two plates 100d and 100c from the top may be coupled by another coupler 200b and individually rotate around the coupler 200b.

The uppermost plate 100d passes the top part of coupler 200a coupling the three plates 100a, 100b, and 100c from the bottom while rotating. That is, the coupler 200a coupling the three plates 100a, 100b, and 100c from the bottom is positioned within the rotational radius of the uppermost plate 100d. Accordingly, since the coupler 200a coupling the three plates 100a, 100b, and 100c from the bottom should not interfere with the rotation of the uppermost plate 100d, the coupler 200a may be inserted upward from the bottom through the lowermost plate 100a. Since the upper end of the coupler 200a inserted in this way does not protrude from the top of the second plate 100c, it does not interfere with the rotation of the uppermost plate 100d.

Similarly, the coupler 200b coupling two plates 100d and 100c from the top is inserted downward from the top of the uppermost plate 100d, so it may not interfere with the rotation of the second plate 100b.

FIGS. 11 and 12 are perspective views showing a coupler of a unit-expandable mobile communication device case according to another embodiment of the present invention and FIG. 13 is an assembly view showing the plate and the coupler of a unit-expandable mobile communication device case according to another embodiment of the present invention.

As shown in FIGS. 11 and 13, a coupler 300 may have a third body 311, a third step 312, a fourth step 315, and an extension 320.

The third body 311 may make the body of the coupler 300 and may be inserted in the coupling hole 110. The third body 311 may have a length that is integer times the thickness of plates 100e and 100f.

The third step 312 may be formed at an end of the first body 311 and fitted in a locking groove 112e on the outermost plate 100e of the coupled plates. The outer diameter of the third step 312 may correspond to the second diameter D2 of the locking groove 112e, so when the third step 312 is positioned in the locking groove 112e, the coupler 300 cannot shake or rattle.

Third elastic portions 314 divided by third slits 313 and elastically deforming radially may be formed in the third body 311. The outer diameter of the third elastic member 314 may be the same as the outer diameter of the third body 311 and the outer diameters of the third body 311 and the third elastic portions 314 may correspond to the first diameter D1 of the first through hole 111c. Since the third elastic portions 314 are divided by the third slits 313, when an external force is applied, ends of the third elastic portions 314 can be deformed such that ends come close to each other. Furthermore, when the external force applied to the third elastic portions 314 is removed, the third elastic portions 314 can return to the original shape by elasticity.

The fourth step 315 may be formed at ends of the third elastic portions 314 and may be inserted in a locking groove 112t formed on the outer side of the outermost plate 100t of the coupled plates.

The third body 311, third step 312, and fourth step 315 of the coupler 300 according to the present embodiment may be formed generally similar to or the same as the socket 210 (see FIGS. 1 to 7) described in the previous embodiment.

The extension 320 may extend from the fourth step 315 in the longitudinal direction of the third body 311 and a head 322 may be formed at an end of the extension.

The head 322 may have a diameter corresponding to the outer diameter of the third step 312. Also, since the head 322 is formed at an end of the extension 320, the head 322 may protrude out of the plate 100 after the coupler 300 is inserted in the coupling hole 110. Since a user can hold the protruding head 322 with a hand, the user can easily separate the coupler 300 from the coupling hole 110 by holding and pulling the head 322.

FIG. 14 is an exemplary view showing a modification of the plate of a unit-expandable mobile communication device case according to an embodiment of the present invention.

As shown in FIG. 14, sub-portions 150 may be further formed on the plate 100. The sub-portions 150 may be formed at an angle on any one side of the plate 100 and one or more coupling holes 110 may be formed in the sub-portions 150.

The coupling holes 110 formed in the sub-portions 150 may be the same as the coupling holes 110 formed in the plate 100.

For example, as shown in (a) of FIG. 14, the sub-portions 150 may be formed in the same shape of partially bending the plate 100. Accordingly, the plate 100 may generally have a U-shape, and though not shown, it may be formed in various shapes such as an L-shape.

Otherwise, as shown in (b) of FIG. 14, the sub-portions 150 may be partially formed at portions of the plate 100.

The plate 100 having the sub-portions 150 can function as a hinge, a bracket, an adapter, or a joint, so it can be assembled in more various shapes. The angles between the sub-portions 150 and the plate 100 may be set in various ways, such as an acute angle, a right angle, and an obtuse angle.

The plate 100 may be composed of separate plates having a first thickness (the thickness of the plate described above) or a second thickness. The second thickness may be integer times the first thickness. That is, the plate may be composed of two types of plates having integer-timed thicknesses, in which the first thickness may be 2.9~3.1 mm.

Coupling holes formed in the plate having the first thickness may be arranged with first gaps and coupling holes formed in the plate having the second thickness may be arranged with second gaps. The second gaps may be two times the first gaps and the first gaps may be 5.9~6.1 mm.

The coupling holes formed in the plate having the second thickness may be larger than the coupling holes formed in the plate having the first thickness. Furthermore, the coupling holes formed in the plate having the first thickness may be further formed in the plate having the second thickness. That is, the plates may have the same thickness or different thicknesses while coupling holes having the same gaps, sizes, and shapes are formed.

In addition, couplers that can be inserted in the coupling holes larger than the coupling holes formed in the plate having the first thickness may also be included. Couplers that can be coupled with coupling holes larger than the coupling holes formed in the plate having the first plate may be formed in the same shape as the couplers that are coupled with the coupling holes formed in the plate having the first thickness, but may have a size that fits the coupling holes larger than the coupling holes formed in the plate having the first thickness.

Accordingly, various shapes of assemblies are possible, so the unit 30 can be implemented in various shapes.

The embodiments described above are just examples and those skilled in the art may understand that the present invention may be easily modified in other ways without changing the technical idea or the necessary features. Therefore, the embodiments described above should be construed as examples in all aspects, and not limited to the present invention. For example, the components described as single parts may be divided, while the components described as divided parts may be assembled.

The scope of the present invention is defined by claims described below, and all of the changes and modifications derived from the meanings, range, and equivalent concept of claims should be construed as being included in the scope of the present invention.

INDUSTRIAL APPLICABILITY

The present invention can be applied to various cases including mobile communication device cases.

REFERENCE SIGNS LIST

10: unit-expandable mobile communication device case
20: case
30: unit
40: sensor unit
50: light emitting unit
60: driving unit 70: control unit
100: plate
110: coupling hole
200, 300: coupler
210: socket
218: guide groove
220: stopper
250: rivet

The invention claimed is:

1. A unit-expandable mobile communication device case, comprising:
   a case having a first flat plate, which has a plurality of coupling holes formed with regular intervals in any one of the column direction and the row direction, the case detachably attached to a mobile communication device;
   first couplers inserted in the coupling holes; and
   a unit having one or more of the coupling holes and detachably attached to the case by being coupled to the first couplers, wherein
   the unit includes a plurality of second plates coupled by second couplers, and
   each of the second plates is rotatably coupled with the second couplers.

2. The case of claim 1, wherein the unit further includes a sensor unit comprising at least one of a sound sensor, an object sensor, a temperature sensor, and a distance sensor.

3. The case of claim 2, wherein the unit further includes:
   a driving unit including a steering unit for turning and steering wheels moving the case and a power unit for transmitting torque to the wheels; and
   a control unit connected to the sensor unit and the driving unit, the control unit for controlling the moving of the case which moves when predetermined stimulation is detected to the sensor unit, and the control unit being connected through a wire or wirelessly.

4. The case of claim 2, wherein the unit further includes a light emitting unit emitting light when predetermined stimulation is detected to the sensor unit, and the sensor unit and the light emitting unit are connected through a wire or wirelessly.

5. The case of claim 1, wherein the unit comprises a figure.

6. The case of claim 1, wherein each of the coupling holes have a through hole having a first diameter and a locking groove having a second diameter that is greater than the first diameter, the through hole is formed on both sides of the first plate or the second plate.

7. The case of claim 6, wherein the coupler includes:
   a socket having a first body that has first elastic portions inserted in the coupling hole and divided by first slits and elastically radially deforming, a first step that is formed at one end of the first body and inserted in a locking step on the outer side of the outermost plate of coupled plates, and a second locking step that is formed at the first elastic portions and inserted in a locking groove on the outer side of another outermost plate of the coupled plates; and
   a rivet having second elastic portions that have an outer diameter corresponding to the inner diameter of an insertion hole formed axially through the socket, are divided by second slits, and elastically radially deform, a second body that is inserted in the insertion hole and radially supports the first elastic portions and a head that is formed at an end of the second body.

8. The case of claim 7, wherein guide grooves are formed in the longitudinal direction of the first slit on an extension line of the first slits on the inner side of the insertion hole of the socket and are spaced from the first slits, and
   guide projections inserted in the guide groove and sliding along the first slits are formed on the outer sides of the second elastic portions.

9. The case of claim 8, wherein stoppers protruding inward from the first slits and restricting movement of the guide projections that have been coupled, are further formed in the first slits.

10. The case of claim 6, wherein the coupler has: a third body divided by third slits having third elastic portions inserted in the coupling hole and elastically radially deforming, a third step formed at an end of the third body and inserted in a locking groove on the outer side of any uppermost plate of coupled plates, a fourth step formed at the third elastic portions and inserted in locking grooves on the outer side of another outermost plate of the coupler plates, and an extension extending in the longitudinal direction of the third body from the fourth step and having a head at an end.

* * * * *